United States Patent [19]
Leonhardt et al.

[11] Patent Number: 5,774,287
[45] Date of Patent: Jun. 30, 1998

[54] SYSTEM AND METHOD EMPLOYING BUFFERING MECHANISM WITH INTERFACE FOR PROVIDING COMPATIBILITY BETWEEN RECORDING FORMATS

[76] Inventors: Michael L. Leonhardt; Charles A. Milligan, both of 2270 S. 88th St., Louisville, Colo. 80028

[21] Appl. No.: 352,464

[22] Filed: Dec. 9, 1994

[51] Int. Cl.$^6$ ................................................. G11B 5/09
[52] U.S. Cl. ........................... 360/48; 395/853; 395/882; 395/894
[58] Field of Search ............................ 360/48, 95, 132, 360/64, 93; 395/441, 825, 410, 821, 853, 865, 500, 894, 882; 348/441; 242/347.1; 371/40.3; 711/111; 369/48, 59, 60, 124; 386/95, 112, 68, 83

[56] References Cited

U.S. PATENT DOCUMENTS

| | | | |
|---|---|---|---|
| 3,706,979 | 12/1972 | Tagawa et al. | 360/93 |
| 3,759,465 | 9/1973 | Janssen et al. | 242/347.1 |
| 5,276,566 | 1/1994 | Clifford, Jr. | 360/64 |
| 5,446,853 | 8/1995 | Dean et al. | 395/410 |
| 5,485,321 | 1/1996 | Leonhardt et al. | 360/48 |
| 5,623,507 | 4/1997 | Burns et al. | 371/40.3 |

FOREIGN PATENT DOCUMENTS 0552903  7/1993  European Pat. Off. .

*Primary Examiner*—Aristotelis M. Psitos
*Assistant Examiner*—Patrick Wamsley
*Attorney, Agent, or Firm*—Brooks & Kushman, P.C.

[57] ABSTRACT

A method and apparatus for achieving compatibility between data storage devices having differing read-write capabilities is disclosed. A track imaging buffer is provided where data can be re-sequenced for optimization of performance of the data storage device into which a recorded medium is loaded. The track imaging buffer is employed whenever a medium bearing data in a format other than the native read-write format of the data storage device is loaded into the device or whenever it is desired to generate a medium for use by a storage device having a native format different from the device in which the medium is to be generated.

27 Claims, 9 Drawing Sheets

TABLE 1

| HEAD 1 | TO SEGMENT GROUP 1,1 |
|---|---|
| HEAD 2 | TO SEGMENT GROUP 1,2 |
| ⋮ HEAD P | ⋮ TO SEGMENT GROUP 1,P |
| HEAD P+1 | TO SEGMENT GROUP 2,1 |
| HEAD P+2 | TO SEGMENT GROUP 2,2 |
| ⋮ | ⋮ |
| HEAD 2P | TO SEGMENT GROUP 2,P |
| HEAD 2P+1 | TO SEGMENT GROUP 3,1 |
| ⋮ | ⋮ |
| HEAD J·P+P | TO SEGMENT GROUP J,P ← SAME AS N |

TABLE 2

| RELATIONSHIP OF RESOURCES USED TO FORMAT/FORMAT IDENTIFICATION | $R_S<F$ | $R_A<F$ | $R_A=F$ | $R_S=F$ | $R_S>F$ | $R_A>F$ |
|---|---|---|---|---|---|---|
| MATCHED | PIECEWISE | DNA | NATIVE | DNA | DNA | DNA |
| HIGH END | PIECEWISE | PIECEWISE | DNA | DNA | DNA | DNA |
| LOW END | PIECEWISE | DNA | DNA | EQUIVALENT | PERFORMANCE | PERFORMANCE |

READ/WRITE MODE SELECTION AS A FUNCTION OF FORMAT IDENTITY AND ALLOWED USE OF DRIVE RESOURCES.

RA = USE ALL APPROPRIATE DRIVE RESOURCES (e.g. 12 CHANNELS)
RS = USE A LIMITED SUBSET OF DRIVE RESOURCES (e.g. 6 CHANNELS OR 3 CHANNELS)
F = USE THE AMOUNT OF RESOURCES THAT EXACTLY MATCHES THAT REQUIRED OF NATIVE MODE TRANSFER OF THIS FORMAT.
DNA = DOES NOT APPLY

FIG. 10

SYSTEM AND METHOD EMPLOYING BUFFERING MECHANISM WITH INTERFACE FOR PROVIDING COMPATIBILITY BETWEEN RECORDING FORMATS

RELATED APPLICATIONS

This application is related to the subject matter disclosed in U.S. patent application Ser. No. 08/176,162 (Leonhardt et al., assigned to the common assignee of the present invention), for a Format and Method for Recording Optimization, filed Dec. 29, 1993, now U.S. Pat. No. 5,485,321 which is incorporated herein by reference in its entirety.

BACKGROUND OF THE INVENTION

1. Field of the Invention

The present invention relates generally to computer data storage and retrieval, more particularly to an apparatus and method for restructuring recording formats to provide read-write compatibility and enhanced read-write performance.

2. Description of the Related Art

From the start, digital computer have required some form of mass data storage to augment the relatively sparse main memory facilities. Magnetic and optical recording media provide such mass memory storage capability in the state of the art. Many forms of recording media drives, using removable recording medium technologies such as cassettes or cartridges, reel-to-reel tape, digital audio tape, eight millimeter tape, magneto-optical and optical disks, flash RAM, and others are now available in the market.

Within each category of media drive devices there can be a family of scalable cost-versus-performance product offerings. Scalability is achieved, for example, by having fewer recording elements in the head of a tape drive and, or alternatively, using fewer recording channels than the number of recording elements in the head. In fact, the lowest cost streaming tape drives use a single head having only one recording element for all read and write functions. Likewise, high performance drives may write many parallel tracks simultaneously by having a greater number of heads or a plurality of recording elements in each head. Electronic circuitry is more complex when implementing a multiplicity of recording channels. Accordingly, because of the critical tolerances in the manufacture of recording heads and the requirement for more complex electronic controls, the greater the performance requirements, the more expensive the drive.

Performance (generally measured by response time, throughput, and storage capacity) is a trade-off for lower cost for applications where lower performance can be tolerated. Moreover, as technology advances and techniques for miniaturization are improved, newer generations of products may also have more heads, recording channels, or both, than the products reaching obsolescence. Compatibility between generations of products becomes another important issue.

Generally, the mass storage technology industry has provided recording formats that are arranged such that higher performance drives can read and write media created on a lower performance drive—generally referred to as backward compatibility or downward compatibility. That is, high performance drives can mimic the limited capability of a low performance drive; when a high performance drives reads or writes with a low performance drive format, it assumes the performance characteristics inherent to the format of the lower level machine (capacity, access times, data rates, and the like) which it is emulating in order to read or write a compatible medium. It is not possible for the lower performance drives to read or write the media of higher performance drives because the lower performance units do not have the head or channel functionality to match the media data format as recorded on such a higher performance drive. Therefore, products have not been produced where the lower performance members of a drive family have a read-write compatibility with the higher performance members. Neither have products been produced that accomplish enhanced performance in the higher performance family members beyond that inherent in the format of the lower performance members. However, this upward compatibility and enhanced performance would be useful and desirable in many applications where data is to be shared between systems that have these different performance members.

For example, in geophysical exploration and satellite telemetry, huge amounts of information are gathered slowly by many shipboard or land-based systems. Therefore, there is a cost incentive to install the lower performance members of a product family in the field. However, subsequent processing of the gathered data is done at a central facility and is preferably done at as high a performance rate as possible. Fast processing of this raw information can create lower costs and additional opportunities. In the geophysical application, high drilling costs are pushing the trends toward more data gathering and increased analysis of the gathered data to enhance the probabilities of successful drilling. Thus, it would be highly advantageous if the low performance drive could write in format that high performance drives could read using enhanced capabilities.

Therefore, there is a need for methods and apparatus which provide data exchange compatibility and enhanced performance in recording media drives.

SUMMARY OF THE INVENTION

In its basic aspects, the present invention provides a method and apparatus for recording format restructuring to provide compatibility and to enhance performance in data mass storage media drives.

An apparatus, adapted for use with a data processing means, for reading and writing data on a removable recording medium in accordance with at least one predetermined data format includes: drive mechanisms for transferring data to and from the medium; a controller, operatively connected to the drive mechanisms, for controlling operation of said drive mechanisms; interface mechanisms, operatively connected to the controller mechanisms, for connecting the apparatus to the data processing mechanisms and allowing data flow between the controller mechanisms and the data processing mechanisms; and buffering mechanisms, operatively connected to the controller mechanisms, for imaging data in a format other than the predetermined format such that data is selectively imaged in the buffering mechanisms during the transferring of data to and from the medium by data processing mechanisms having a data reading and writing format capability other than the predetermined format.

In another aspect, the present invention provides a method for data format restructuring in a storage medium drive having a read-write head device, a transport device for receiving a media and transporting the media across the head device, a controller device for controlling operation of the head device and the transport device and having an interface device for connecting the drive to a communication bus of a host system, the controller device is adapted to transfer data to and from the media in a first predetermined format. The data is resequenced for compatibility and enhanced performance by providing a track imaging buffer, connected to the controller device, and restructuring data in the track imaging buffer when data is transferred by the controller device in a format other than the first predetermined format.

It is an advantage of the present invention that low performance data recording drives have full read-write compatibility with high performance counterparts.

It is an advantage of the present invention that high performance data recording drives will operate at their full capacity and performance while reading a recorded medium created on a low performance drive.

It is another advantage of the present invention that it allows a cost versus performance scalability for equipment in a variety of data recording applications.

It is still another advantage of the present invention that it improves data processing speed in creating cross-format compatible media.

Other objects, features and advantages of the present invention will become apparent upon consideration of the following detailed description and the accompanying drawings, in which like reference designations represent like features throughout the FIGURES.

DESCRIPTION OF THE DRAWINGS

FIG. 10 (TABLE 2) is a matrix chart of the relationship between media format identification and the read-write mode that should be selected.

The drawings referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventor(s) for practicing the invention. Alternative embodiments are also briefly described as applicable. In an exemplary embodiment, an application of the present invention in a magnetic tape read-write device will be described. However, it should be recognized by a person skilled in the art that the present invention is applicable to other media and drives for mass data storage. No limitation is intended by the inventors nor should any be implied from the use of an exemplary embodiment to facilitate the description of the invention.

Figure 1:
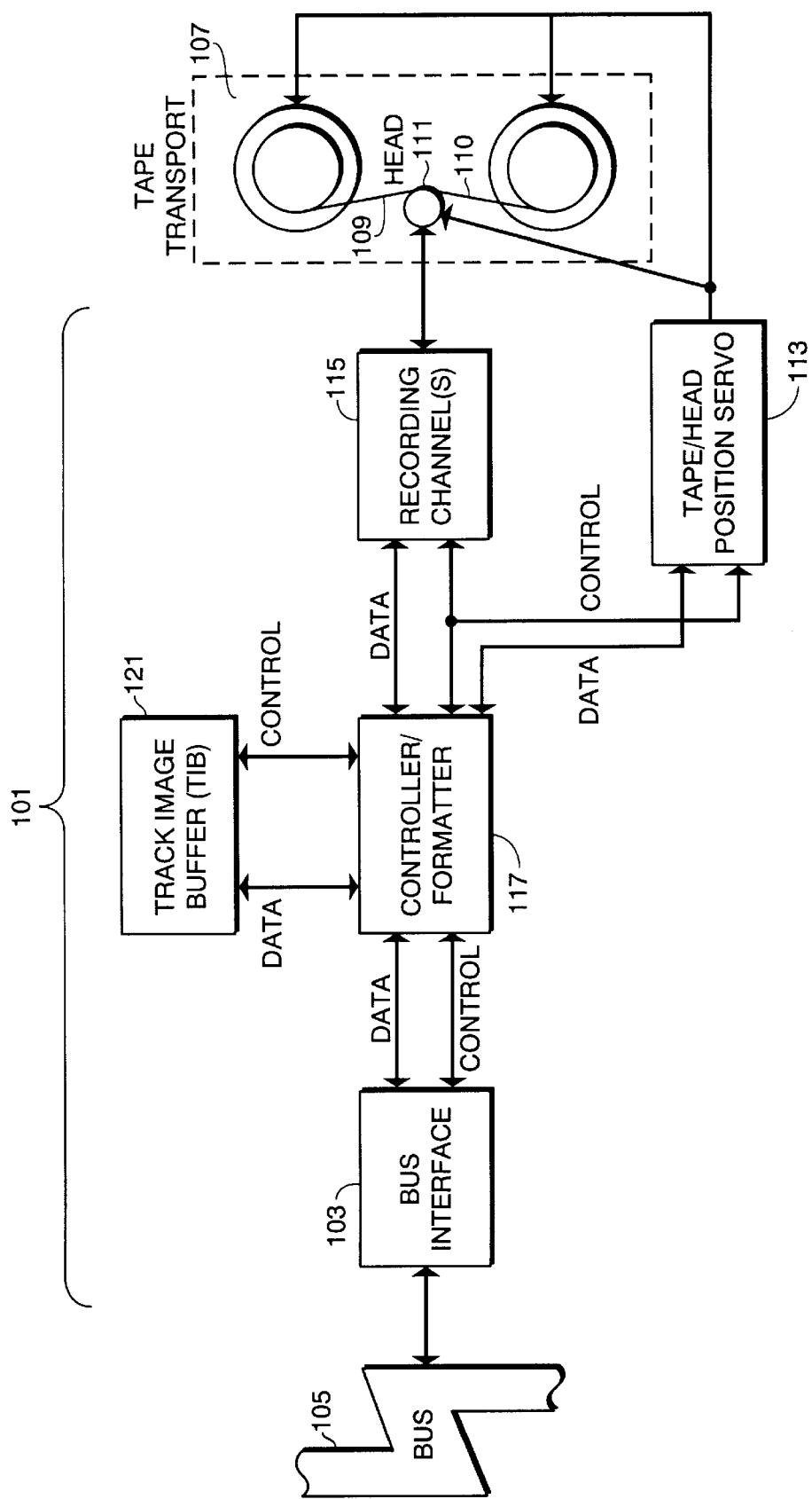
FIG. 1 is a block diagram of a data read-write system in accordance with the present invention.

A drive controller system 101 in accordance with the present invention is shown in FIG. 1.

As would be well-known in the art, certain elements of the system 101 comprise standard components. An appropriate bus interface 103, such a small computer system interface (SCSI), operatively connects the controller system 101 to an input-output communications bus 105. The input-output communications bus 105 would generally connect the drive controller 101 to a network or host computer (not shown). The controller system 101 is connected to a tape transport mechanism 107.

As is also known in the art, tape transport mechanisms 107 comprise a magnetic tape recording medium 109, having a defined path 110, and a read-write head 111. The tape transport mechanism 107 and read-write head 111 are controlled by a tape/head positioning servo device 113. Data is transferred to and from the tape 109 via head 111 through electronic recording channel circuitry 115.

As digital data is recorded on the tape 109 and retrieved from the tape 109 in accordance with either industry standard or proprietary logical and physical formats, a controller-formatter unit 117 is provided in accordance with the predetermined format employed in the system 101. The format may also include information for servo track positioning of the media according to standard industry practices.

In accordance with the present invention, a track image buffer 121 is connected to the controller-formatter unit 117 for data and control signal exchange, (generally indicated in the FIGURE by the labelled arrows interconnecting the various components).

Figure 2:
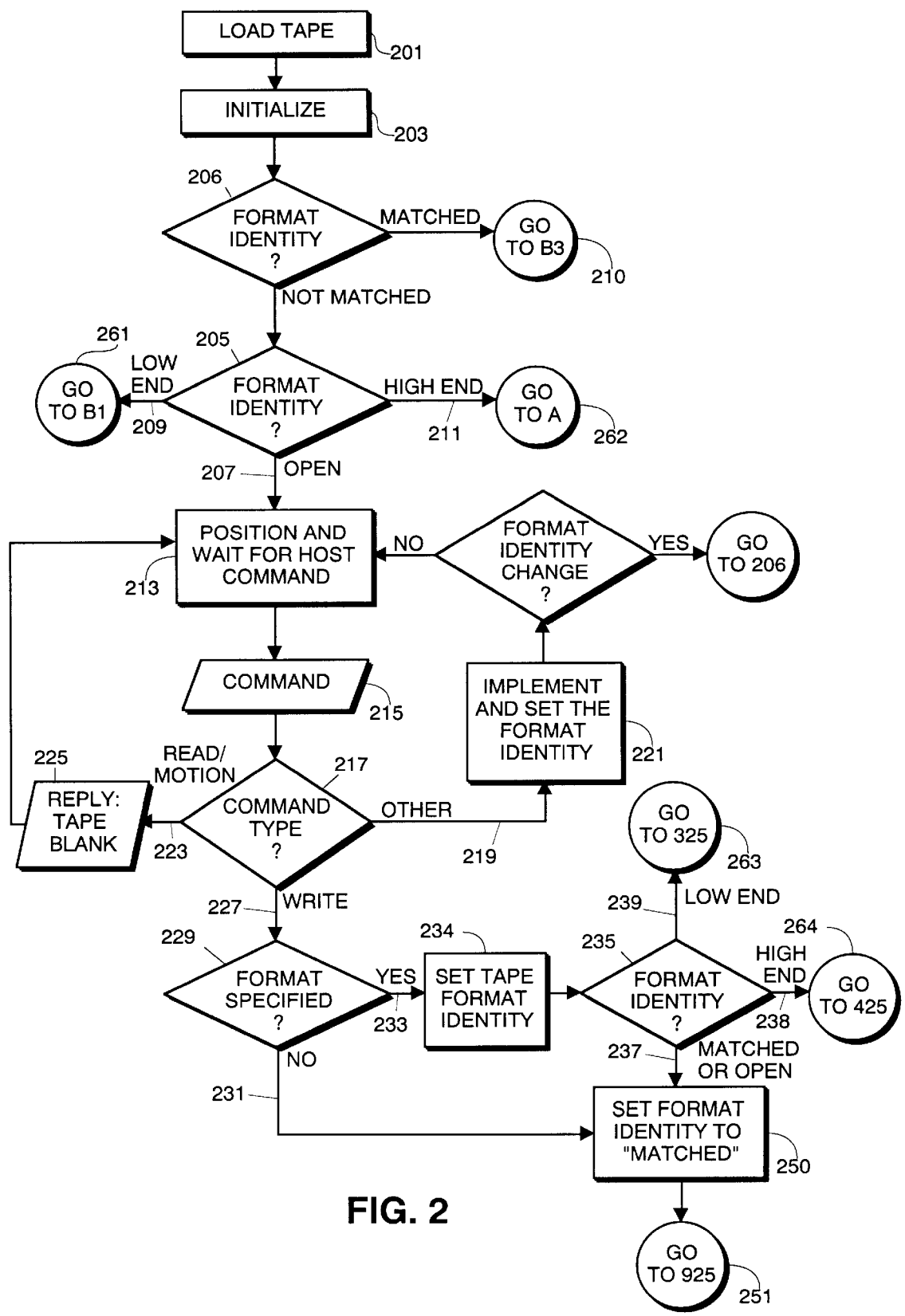
FIG. 2 is a flow chart depicting the method of reading and writing data in accordance with the present invention in a system as shown in FIG. 1.
Figure 3:
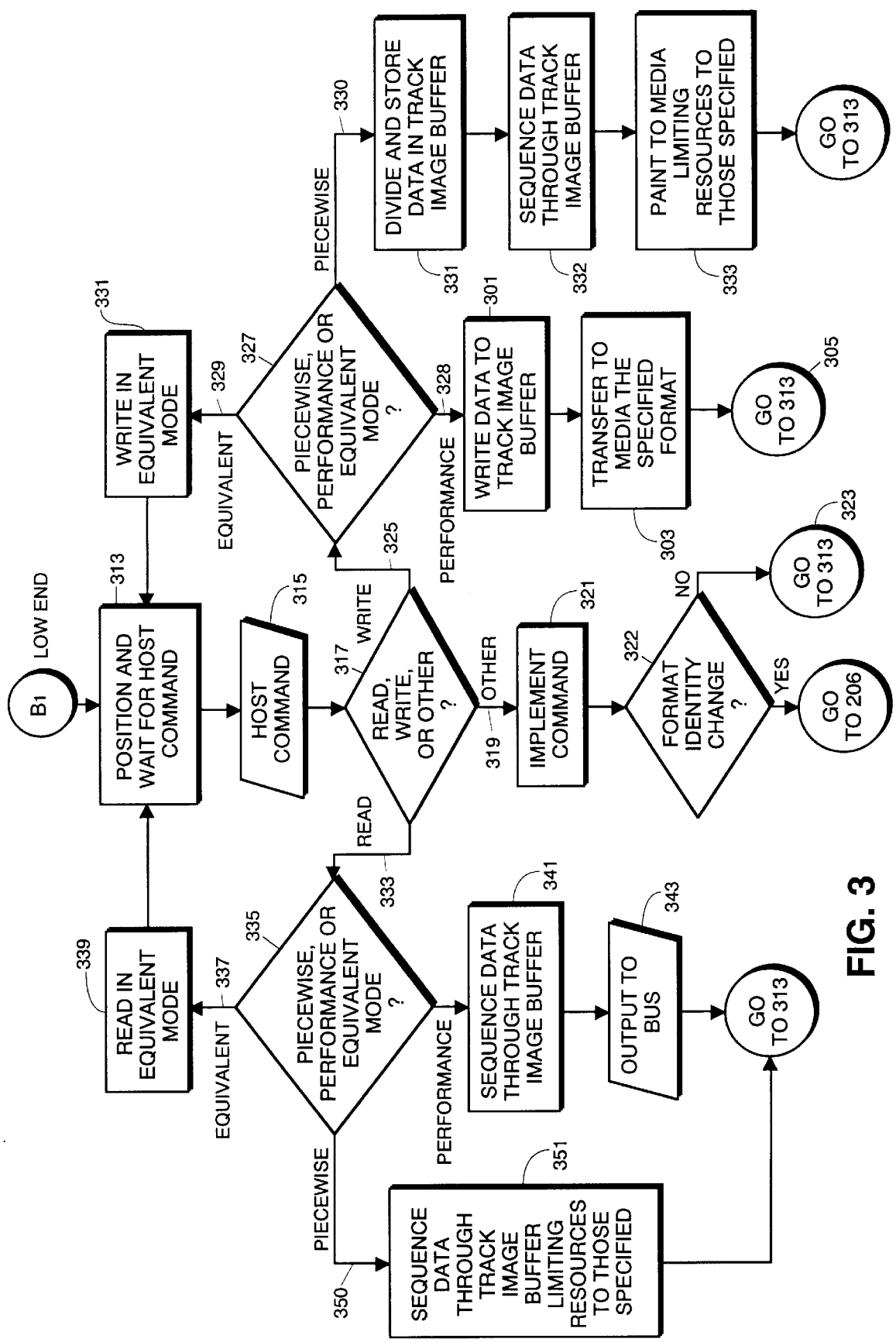
FIG. 3 is a branch continuation of the flow chart of FIG. 2.

Operation of the system 101 in accordance with the present invention, namely, control signals and data flow is shown in FIGS. 2 and 3. Referring to FIG. 2, operation begins when a tape 109 is loaded 201 in the tape transport 107. The system is initialized 203, for example, in accordance with an industry standard boot-up routine. Based upon the user, the system or the application, the tape 109 will have an identifiable format 205. In terms of the present invention, there are four possible format identities:

"MATCHED"—in which the tape is formatted and the system 101 has a capability exactly equal to the read-write format indicated;

"OPEN"—in which the tape may be unformatted or, if pre-formatted by the media manufacturer, will have only factory headers recorded, such as those necessary for identification and servo tracking;

"LOW END"—in which the tape is formatted and the system 101 has a capability greater than the read-write format indicated; or "HIGH END"—in which the tape is formatted and the system 101 has a capability less than the read-write format indicated. In using the system to store and retrieve data on the tape 109, there are four possible READ-WRITE modes in accordance with the present invention:

"NATIVE"—in which the tape format exactly matches the device resources and read-write functions are accomplished directly without the use of the track image buffer 121;

"PERFORMANCE"—in which a tape format is identified as LOW END and the device uses all possible resources, or some specified subset that is greater than that required to process the tape format in the NATIVE mode, to bring data to and from the track image buffer 121 (for example, the format is "n" tracks wide, the device has "m" head read-write elements, and does reading and writing of "m" tracks in parallel where "m" is greater than "n");

"EQUIVALENT"—in which the tape format is identified as LOW END and the device is restricted to using only those resources that match the specification of the format and the track image buffer 121 is not used (for example, the format is "n" tracks wide, the device has "m" head read-write elements but does reading and writing of only "n" tracks in parallel where "m" is greater than "n"); and "PIECEWISE"—in which independent of the tape format, the device has fewer resources or uses fewer resources than the format requires to read and write; the format is assembled in pieces, placing or taking the pieces algorithmically into and from the track image buffer 121, thereby constructing the appropriate format piecewise.

Table 2 (FIG. 10) maps the relationship between format identification and the read-write mode that should be selected. The selection of the read-write mode can be set to default to any of the options for a particular format identification, the preferred defaults are those that give the most performance (noted in bold in Table 2).

For the ensuing discussion of these options, it is assumed that data is passed through the drive subsystem's buffers immediately to and from the host and the drive. The present invention applies equally to cached as well as non-cached control units. However, as is the standard procedure with cached control units, there can be some delay between the activities on the host channel side and the recording channel and drive side. Those skilled in the art will be able to readily modify the logic to accommodate such time delays.

LOADED TAPE FORMAT IDENTITY= MATCHED

Figure 9:
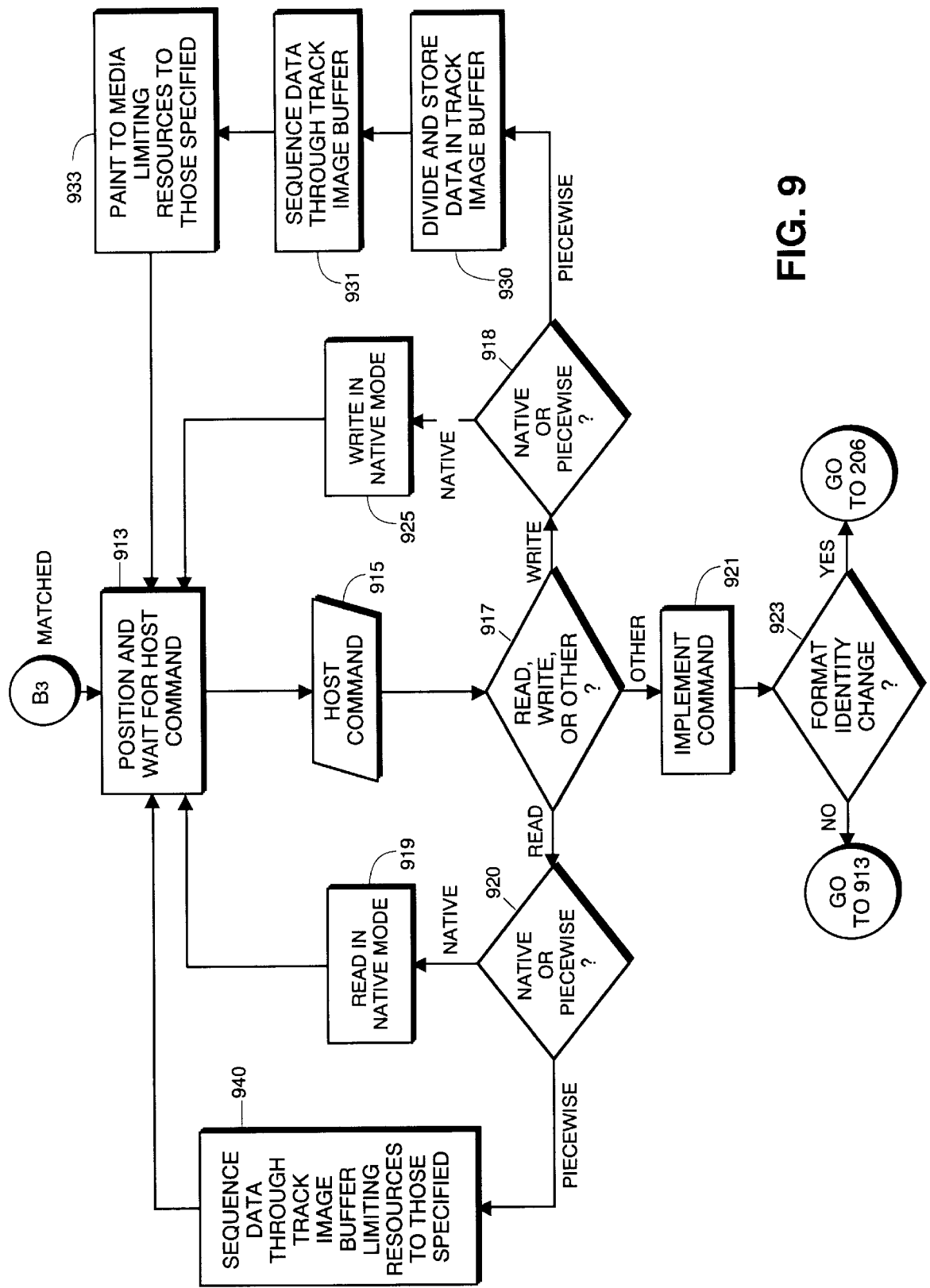
FIG. 9 is a branch continuation of the flow chart of FIG. 2.

First, consider the loaded recording medium case 206 in which the tape format identity is MATCHED. See FIG. 2, GO TO B3. The tape loaded 201 in the transport is formatted with a format that calls for capabilities identically equal to those of the device. Processing is then continued as shown in FIG. 9.

The device positions the tape and waits for a host command 913. READ and WRITE commands 915 can be executed in the NATIVE mode 919, 925, or the PIECEWISE mode 930, 940.

In the NATIVE mode, the track image buffer 121 is not used until an OTHER host command 915 (for example, a mode reset command 917) specifies 921 a new format identity 923, namely LOW END or HIGH END. Note that a WRITE command could begin with a new format identity and in that case would be considered an OTHER command. If a new format identity 923 is commanded, YES, the specified processing returns to FIG. 2 at step 206 as, by definition, the condition of tape format identity has changed to something other than MATCHED.

In the PIECEWISE mode, the host system has indicated that less performance is desired and that the tape system is to use a subset of its available resources to read or write the data. If the read mode is PIECEWISE 920, 940, the track image buffer 121 is employed 940 specifically to limit the performance. Although the device has the same resources (e.g., twelve channel capability) as required by the format, the host system (or user) desires to limit the performance to less (e.g., six channels). The reading is performed as described hereinafter, HIGH END FORMAT, READ COMMAND. Once the command to read has been processed, the system is readied to receive the next command 913. If for WRITE command process 917, 918 less performance is desired (for example, a drive with twelve read-write elements and channels and a format with twelve tracks but limited to using only six heads at a time so that the data rate will be kept at a minimum), the PIECEWISE mode is selected 918, 930.

The data is first placed in the track image buffer 121 in the appropriate locations and sequence compatible with the subset of the drive's capability that matches the limitations specified for the limited subset of performance. The device can then write from the track image buffer, 121 using those resources. Thus, before the data is written to tape 109, the data is first written to the track image buffer 121. A special write routine is instituted wherein as the data is written 930 to the track image buffer 121, it is formatted to a twelve track format. The data (including raw data, appropriate error correction codes, header data, servo tracking information, and the like) is routed 930 by the controller-formatter 117 to the track image buffer 121. The track image created in the track image buffer 121 mimics that of the drive, in this example, twelve track compatible. From the track image buffer 121, the data is transferred 931, 933 to tape 109 using the appropriate recording channels 115 (in this example, six channels), writing with the specified limited capability in order to lay down the data on the tape in a track format equivalent to the native capability of the drive but at a lower performance. When finished with the track image buffer 121 imaging and tape reproduction cycle, the system 101 is readied (GO TO 313) for the next host command sequence.

OPEN MEDIA

Now consider the OPEN recording medium case 207. If the tape 109 is "blank," it could be factory pre-formatted or unformatted. The system can position the tape 109 to an appropriate load point, such as a factory Beginning-Of-Tape (BOT) marker, and wait for a host computer (not shown) command 213.

If 217 the command 215 is a FORMAT command 219 (for example a MODE SET that specifies the tape format identity to be used), the tape format identity is established 221 and processing is continued 206.

If 217 the command 215 is a READ or a MOTION command 223, the system 101 must reply that the tape is blank 225, indicating that corrective action is required of the host.

OPEN MEDIA, WRITE COMMAND

If 217 the command is a WRITE command 227, the write format must be determined 229 either from the WRITE command parameters or by default (although not shown, this format determination upon a WRITE command could be applied whenever a WRITE command is encountered regardless of the tape format identity).

If 229 no format is specified 231, the normal write routine mode for the system 101, that is NATIVE mode, is assumed and will be employed. The tape format identity is set to "MATCHED" 250 and processing is continued 925. Once the WRITE sequence is finished, the process continues again in anticipation of the next command 913.

If a format is specified 233, that specification is noted 234 and the decision is made 235 where processing is to continue. If 235 the specified format is the MATCHED or OPEN tape format identity, then the normal write routine will be again employed 250, the format identity is set to MATCHED and processing is continued 925. Once the WRITE sequence is finished, the process continues again in anticipation of the next command 913.

If 235 the specified format is the LOW END tape format identity 239, processing is continued at step 325.

If 235 the specified format is the HIGH END tape format identity 238, processing is continued at step 425.

FIG. 3 thus relates to two conditions:

(1) either upon initialization 203 it was determined that the tape format identity 206, 205 is compatible with what is deemed 209 as a LOW END tape format identity (enter FIG. 3 at $B_1$), or (2) in the WRITE process for an OPEN format tape command 215, 227, it has been determined that the specified format 229, 233 is not the MATCHED format 235, 237 nor the HIGH END format 235, 238, but is the LOW END format 235, 239 (FIG. 3 at 325).

In either case, the tape drive processes shift from FIG. 2 to FIG. 3.

OPEN MEDIA, WRITE LOW END

This latter condition, that is to write with a format less than the capability of the drive generally occurs when a system 101 being used to record data has the native capability of writing many tracks, e.g. twelve, in parallel but it is desired to generate a tape for use with a lower capability drive, e.g., a six track read-write system. In other words, it is now desired to generate a tape for a "low-end" drive using a "high-end" drive.

Whenever a non-native read or write mode is intended a track image buffer 121 (FIG. 1) is employed. The track image buffer 121 can be an addressable random access memory device as would be known in the art; it is generally off-line to the NATIVE format data flow. The specifications of the track image buffer 121 will be controlled by the design of a specific system 101. In general, the track image buffer 121 is used in accordance with the present invention with gating of appropriate head elements to "paint an image"— that is, to load data to and from the buffer piecemeal in an algorithmically determined fashion—in the track image buffer 121 during a reading or writing of a tape in a non-native mode in order to optimize system compatibility between systems of differing native capabilities.

The track image buffer 121 is to be used in both READ and WRITE command functions. Therefore, the track image buffer 121 should be large enough to be organized into at least two "volumes" (where a "volume" is a predetermined data set, e.g., a page of printout) such that the first volume is available while the second volume is being imaged in the track image buffer 121. Appropriate addressing and pointing mechanisms as would be well known in the art can be employed to affect these functions. In general for the lowest cost implementation of the method of the present invention, only a single volume capable track image buffer 121 is used.

Referring again to FIG. 3 at 325, 327, the system 101 has established that a tape is to be written by a high-end drive for use in a low-end drive. Thus, to continue the example, if the high-end drive where to perform a NATIVE write, it would paint the tape 109 with data received from the bus 105 twelve tracks simultaneously. However, this would make the tape incompatible with the low-end drive where the data would be out of synch. Therefore, when the write format specified is less than the NATIVE mode capability. The system must choose a read-write mode, the level of performance to be used being either PIECEWISE 327, 330, or PERFORMANCE 327, 328, or EQUIVALENT 327, 329, as the process continues.

The device can be controlled to use exactly the resources necessary for writing the LOW END format and write in the EQUIVALENT mode 331. In this example, the device would use half of the heads at a time and not use the track image buffer 121 at all. If the format were not an integral multiple of the device capabilities, the device would be controlled to use only those resources actually needed. This slows the performance of the HIGH END device to that of the LOW END device.

If however more performance is desired, the PERFORMANCE mode is selected 327, 328. The data is first placed in the track image buffer 121 in the appropriate locations and sequence compatible with the drive's full capability to augment performance. The device can then write from the track image buffer 121 using all (or some specified subset (e.g., nine tracks versus six or twelve) that is greater than the format) available resources. Thus, before the data is written to tape 109, the data is first written to the track image buffer 121. A special write routine is instituted wherein as the data is written to the track image buffer 121, it is converted from the exemplary twelve track format to a six track format. The data (including raw data, appropriate error correction codes, header data, servo tracking information, and the like) is routed 301 by the controller-formatter 117 to the track image buffer 121. However, the track image created in the track image buffer 121 mimics that of the low-end drive, in this example six track compatible. From the track image buffer 121 the data is transferred 303 to tape 109 using the appropriate recording channels 115; writing with all (or some specified subset (e.g., nine tracks versus six or twelve) that is greater than the format) the available capability in order to lay down the data in a track format equivalent to the native capability of the low-end drive but at a higher performance. When finished with the track image buffer 121 imaging and tape reproduction cycle, the system 101 is readied (GO TO 313) for the next command sequence.

If however, less performance is desired, for example, a drive with twelve read-write elements and channels transferring a six track format but limited to using only three heads at a time so that the data rate will be kept at a minimum, the PIECEWISE mode is selected 327, 330. The data is first placed in the track image buffer 121 in the appropriate locations and sequence compatible with the subset of the drive's capability that matches the limitations specified for the limited subset of performance. The device can then write from the track image buffer 121 using those resources. Thus, before the data is written to tape 109, the data is first written to the track image buffer 121. A special write routine is instituted wherein as the data is written 331 to the track image buffer 121, it is formatted to a six track format. The data (including raw data, appropriate error correction codes, header data, servo tracking information, and the like) is routed 331 by the controller-formatter 117 to the track image buffer 121. The track image created in the track image buffer 121 mimics that of the low-end drive (in this example, six track compatible). From the track image buffer 121, the data is transferred 332, 333 to tape 109 using the appropriate recording channels 115 (i.e., three for this example), writing with the specified limited capability in order to lay down the data in a track format equivalent to the native capability of the low-end drive but at a lower performance. When finished with the track image buffer 121 imaging and the tape reproduction cycle, the system 101 is readied (GO TO 313) for the next host command sequence.

LOW END FORMAT MEDIA

In addition to covering the WRITE command sequence for an OPEN tape as explained above, FIG. 3 also relates to the case where a loaded tape 201 has been identified from header data as having a format 205 that is LOW END 209, namely lower than the read-write capability of the system 101 into which it has been loaded. After such a format identity 206, 209, GO TO B1, the tape is positioned and the system 101 waits for a host command 313. The host command 315 will be identified as a READ, WRITE or other function 317.

Functions other than READ or WRITE (e.g., REWIND, SEEK, and the like) 319 are implemented 321 and the system 101 readied 323 for the next instruction. If the command just executed 321 changed or had the potential to change the tape format identity, it must be checked 322 and, if changed, processing continues at step 206.

If a WRITE command sequence is implemented 325, a determination of the format in which the data is to be written is made 327. If the write mode specified is EQUIVALENT 329, data can be written 331 directly to the tape 109 without the use of the track image buffer 121 at the performance level of a LOW END drive. However, depending upon the overall strategy of recording data, it may be desirable to write the data in a format for a low-end drive with higher or lower performance.

If higher performance is desired, the write mode specified 327 is PERFORMANCE, the data transfer is made using the track image buffer 121 in the same manner 301, 303, 305 as explained above with respect to writing to an OPEN tape in the PERFORMANCE mode.

If lower performance is desired, the write mode specified 327 is PIECEWISE, the data transfer is made using the track image buffer 121 in the same manner 331, 332, 333 as explained above with respect to writing an OPEN tape in the PIECEWISE mode.

It will also be recognized at this juncture that a tape with mixed formats is also made possible by the present invention by providing tape format identity checks and as when the packetized serpentine longitudinal recording method in accordance with U.S. Pat. No. 5,485,321 is employed.

LOW END FORMAT, READ COMMAND

Another possibility is that the identified format 205 is less than 209, 261 the native capability of the drive system, and that the host command 315 is a READ function sequence 333. In LOW END format data processing, the READ mode identified is EQUIVALENT or PERFORMANCE or PIECEWISE 335.

If EQUIVALENT 337, the data is read 339 from the tape without intermediary use of the track image buffer 121 at the LOW END drive capability and the system readied to receive the next command 313.

If the READ mode is PERFORMANCE, the track image buffer 121 is employed 341. The track image buffer 121 is here employed specifically to enhance performance 341. As the READ mode capability of the system 101 is greater than the formatted data on 109—for example, twelve channels available to look at six track recorded data—the data is read (either using all appropriate resources or using a limited subset that is greater than that specified in the format) in parallel simultaneously and directed to the track image buffer 121 rather than the bus interface 103. The track image buffer 121 is employed to appropriately order the data so read. That is, while six of the twelve heads are reading the next logical set of data (which can be routed directly to the bus 105), the other six heads are reading a set of data out of sequence. The controller-formatter 117 is charged with placing the out-of-sequence data into the track image buffer 121 for routing to the bus 105 at the appropriate time, that is, in sequence for the host. It will be recognized that with appropriate addressing and pointers for the track image buffer 121, that the data sequencing process can be designed to suit the expediency of the particular implementation of the present invention.

If the read mode is PIECEWISE 335, 350, the track image buffer 121 is employed 351 specifically to limit the performance. Although the device has more resources (e.g., twelve channels) than required by the format (e.g., six channels), the host system or user desires to limit the performance to less (e.g., three channels). The reading is done as is described below for HIGH END format READ command selection. Once the command to read has been processed, the system is readied to receive the next command 313.

HIGH END

Referring back to FIG. 2, two further conditions require disclosure:

(1) it may be determined that the loaded 201 and initialized 203 tape has a HIGH END format 211, 260 that is, the data on tape is in a format that is greater than or equal to the native read-write capability of the drive system 101—for example, a tape written in multiple parallel tracks is loaded into a low-end drive, even a single track, streaming tape drive, and (2) a previously OPEN tape 207 is to be written 227 in a specified format 229, 233, that is not MATCHED 235, 237 nor LOW END 235, 239, but is HIGH END 235, 238, 264. Both situations are handled substantially identically.

HIGH END FORMAT MEDIA

During initialization 203, a tape format identity can be recognized as HIGH END 206. In other words, the drive native capability is lower than the recorded data formatting requires.

After positioning to wait for a host command 413, and processing a host command 415, 417, if the command is other than a READ 455 or WRITE 425 function, the OTHER command 419 is implemented 421 and then, if that command did not change the tape format identity 422, NO, the system 101 is readied 423 for the next command. If the command just executed changed the tape format identity 422, YES, processing is continued at step 206.

HIGH END FORMAT, WRITE COMMAND

Figure 4:
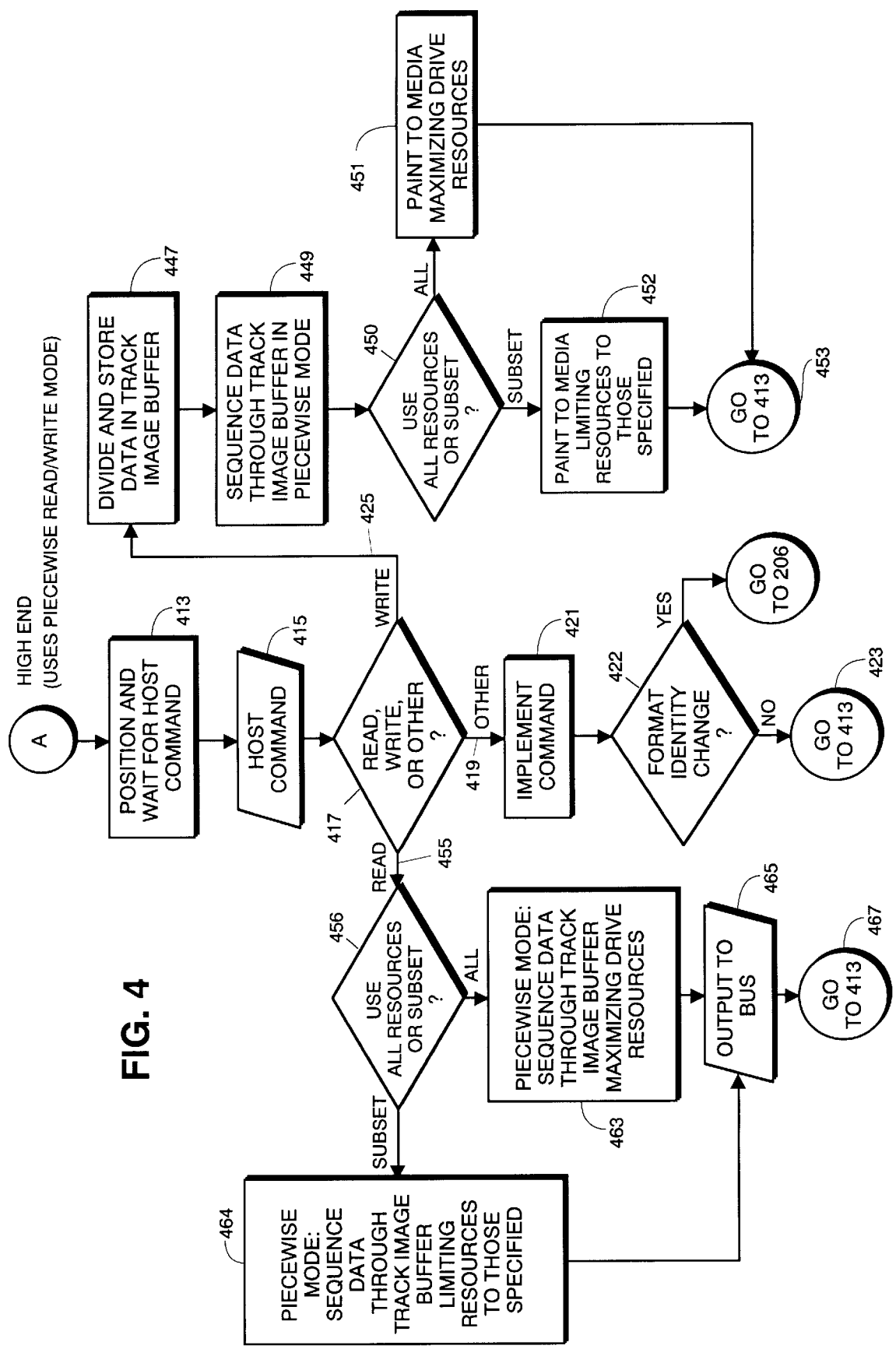
FIG. 4 is a branch continuation of the flow chart of FIG. 2.

When the system 101 receives a WRITE command sequence 425, a determination can be made as to whether a new format is specified. If a format other than HIGH END is specified in the WRITE command, then processing would have to continue as detailed for FIG. 3 (LOW END) or FIG. 9 (MATCHED) similarly to the logic described for format specification in the WRITE command for FIG. 2 (OPEN). It is assumed that the format does not change in FIG. 4 (HIGH END); either there is no specification or the specification is to write data in a HIGH-END format, that is, greater than the native capability of the system 101 (e.g., the format identified 205 as already used on the tape 109), the track image buffer 121 is again employed in the process. Thus, the processing continues at step 447. Since a HIGH END format needs to be piecewise constructed, the system must use the track image buffer 121 in the PIECEWISE mode.

Rather than routing the data from the host on bus 105 to the tape 109, the data is transferred 447, 449, to the track image buffer 121 by the controller-formatter 117, choosing 450 to either maximize use of the drive resources 451 or limit use of the drive resources to those specified 452 and then painting the data in the sequence it would be accessed by the high-end drive—to continue the example in a twelve track parallel format, as opposed to directly writing the data serially with the single recording channel available. The data in the track image buffer 121 is then processed such that the single head writes the data in the parallel access sequence. That is, rather than the head 111 receiving the data in a native serial sequence:

byte 1, byte 2, byte three, et seq., the data from the bus 105 is matrixed as:

track one, byte one; track two, byte one; . . . track twelve, byte one;

and then starting the sequence again for the second byte:

track one, byte two; track two, byte two; et seq., such that it can be transferred through the single recording channel 115 when the single read-write head 111 is positioned at the appropriate segment of tape where a twelve channel system would be accessing the data. In other words, if the entire data stream to be written is divided by twelve for a twelve track access, the head 111 would write every twelfth byte in the first pass of the head 111 over an appropriate section of recording medium, the second set of twelfth bytes in the second pass, and so on, until a twelve track data base is painted from the track image buffer 121 to the tape 109. (To speed processing, data can be written bidirectionally by the single element head by reversing the transfer order from the storage matrix in the track image buffer 121.)

In summary, the data to be transferred is divided 447 into "N" parts where:

N=high-end format track number write channels available and matrixed 449 in the track image buffer 121 accordingly. Then, the resequenced data 449 is written to tape 451 from the track image buffer 121 in the sequence compatible with the high-end format. After writing 451, the system is repositioned 453 in anticipation of the next host command.

HIGH END FORMAT, READ COMMAND

After initialization 203, it has been established 205 that the data on the tape is in a format that is greater than or equal to the native capability 211 of the drive system 101.

When a READ command sequence is received from the host 415, 417, 455, the data on the medium is in a format greater than the system 101 read capability—for example, reading a tape written in a twelve track parallel format with a single channel system—then the track image buffer 121 is employed using PIECEWISE mode, choosing 456 to maximize use of the drive resources 463 or to limit use of drive resources to those specified 464.

If a format other than HIGH END were specified in the READ command, then processing would have to continue as detailed for FIG. 3 (LOW END) or FIG. 9 (MATCHED) in accordance with the logic described for format specification in the READ command in FIG. 2 (OPEN). For simplicity, it is assumed that the format does not change in FIG. 4 (HIGH END) in that either there is no specification or it is consistent with HIGH END format.

The data is read from the tape 109 serially, viz.:

track one, byte one; track one, byte two; . . . et seq.

However, its logical order as written was:

track one, byte one; track two, byte one; . . . track twelve, byte one;

and then continuing with the next sequence:

track one, byte two; track two, byte two; . . . et seq.

Therefore, the controller-formatter 117 uses the track image buffer 121 to sequence the data appropriately 463 or 464 before transferring the data 465 to the bus 105 via the bus interface 103 where it is accessed by the host. When the data has been fully output 465, the system can be reset 467.

TRACK IMAGE BUFFER MAPPING

From the foregoing, it is now evident that the track image buffer 121 of the present invention augments the native read-write mechanism capability of a drive and provides recording media compatibility and performance advantages between low-end drives and high-end drives, going in either direction.

Using a low-end drive with a track image buffer 121, a recording medium can be written for processing by a high-end drive by mapping the data in the buffer appropriately to match the high-end drive capability before painting the data on the medium in the non-native format of the high-end drive.

Using a low-end drive with a track image buffer 121, a medium having data in a high-end format can be read by mapping the data in the buffer appropriately to match the native format capability before sending the data to the host.

Using a high-end drive with a track image buffer 121, a recording medium can be written in a low-end drive format by mapping the data in the buffer 121 and using all additional recording channels available to facilitate the transfer, vastly reducing the write cycle time.

Using a high-end drive with a track image buffer 121, a medium having data in a low end format can be read in parallel to the buffer 121 for mapping back into its logical order, vastly reducing the read cycle time.

The present invention is applicable to any data sets on a recording medium having identifiable boundaries. As would be known in the art, such boundaries may be physical location markers (EOT/BOT), file markers, or the like. Virtual volume markers as disclosed in U.S. Pat. No. 5,485,321 provide an example of an enhanced recording method where boundaries may be established during the data storage process. The mapping routines will be dependent upon the predetermined format incompatibilities, medium recording boundary conditions, servo tracking mechanisms, and error correction code routines employed in a particular system.

Certain rules for mapping to optimize performance become apparent once certain parameters are established. For example, since the lower performance drive lacks the number of parallel heads to write the HIGH END format, using the track image buffer 121 creates a compatible track image by making multiple passes of its media, writing as many tracks at a time as it has recording channels. Between passes over the tape section being written, the head must be stepped to a new position, creating a latency. Similarly, in the read process, data is read off the HIGH END format generated tape in piecewise fashion and routed to the track image buffer 121 to be mapped into the high performance format. Reversing the order of events to the write process, the head will read over a tape section, reposition, read the next section, and so on until the volume is read; the data being read is mapped in the track image buffer 121, recreating to the high performance format, including ECC, header control fields, and the like. Once an image is complete in the track image buffer 121, the data is routed through the bus 105. Again, head repositioning latencies are created. Therefore, it is advantageous to predetermine the shortest reposition head seek stages.

Figure 5:
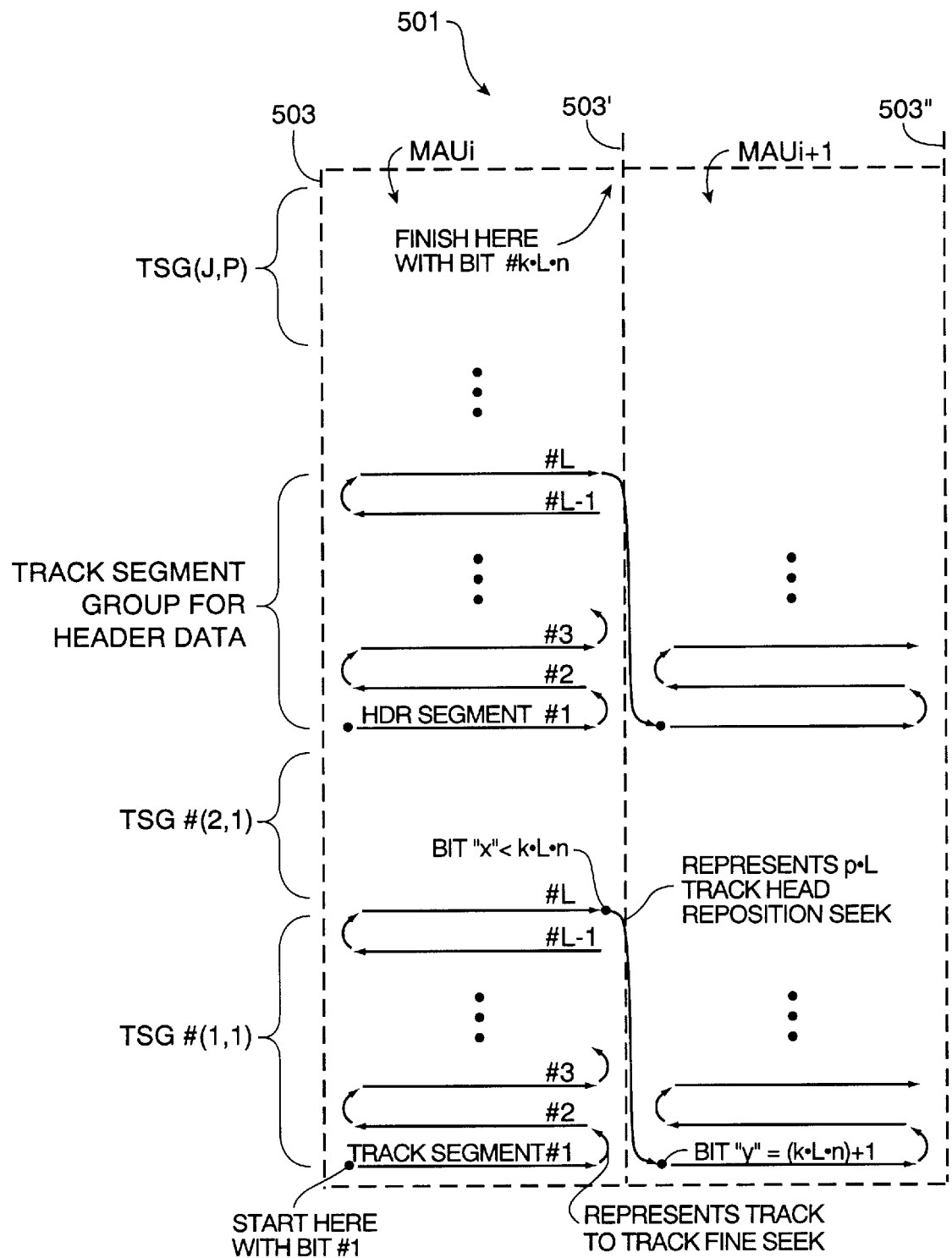
FIG. 5 is a schematic depiction of an exemplary section of magnetic tape showing a data recording scheme in accordance with the present invention.

Referring to FIG. 5, a section of recording tape 501 which demonstrates a serpentine recording optimized format in accordance with U.S. Pat. No. 5,485,321 is shown.

Let a "track segment" be generally defined as the number of bits written (or read) by a single head element between segment boundaries 503 of minimum allocation units ("MAU") of data in a high performance drive data organization format. "Track segment groups"—"$TSG_{(a,b)}$"—are "L" transversely consecutive track segments, where: "L" is an integer $\geq 1$; "a" is an integer $\geq 1$ and $\leq j$, where "j" is the number of parallel heads required to transfer the data in the NATIVE format mode; and "b" is an integer $\geq 1$ and $\leq p$, where "p" is the number of sets of passes required to transfer all the bits in a MAU. Let "L" thus define the number of passes of a single head element between the segment boundaries 503 which delineate the longitudinal boundaries of a MAU required to fill the entire segment group, where "L" is an integer $\geq 1$. For example, $TSG_{(1,1)}$, begins with bit 1 at the lower left corner of $MAU_i$, where "i" is an integer $\geq 1$. As data is written beginning with track segment #1, when the boundary 503' is reached a "fine seek"—that is a relatively quick movement of the head to the next track shown by a curved arrow labelled accordingly—shifts to track segment #2. Data writing continues similarly until track #L has been written. It can now be recognized that $MAU_i$ thus can contain $TSG_{(1,1)}$ through $TSG_{(j,p)}$, including a track segment group for header data.

At some predetermined point in accordance with the present invention, a TSG is written with a full data packet and it is advantageous to change to $MAU_{i+1}$ as shown when bit "x", where x=(k×L×n), has been written, where "n" is an integer $\geq 1$ and represents the number of TSG in a single MAU (that is, j×p=n, and p is minimized, i.e., p=1, when the number of head elements that are concurrently active, j=n); and "k" is an integer $\geq$ the number of bits in a track segment. A head reposition (shown as the arrow labelled "Represents pxL track head reposition or seek") occurs and the next data bit written—"y"=(k×L×n)+1 starts $TSG_{(1,2)}$ of $MAU_{i+1}$. Data in $MAU_{i+1}$ is laid down similarly in serpentine tracks between its allocation unit boundaries 503', 503".

For a NATIVE mode operation, data bits are identified as read from the medium using parallel read-write transfer (that is e.g., a three head read/write of a three track format—LOW END format performance—or a twenty-three head read/write of a twenty-three track format—HIGH END format performance).

The following description will be for the READ mode; writing will be analogous.

$STEP_0$ would begin as each head element reads the first bit, e.g., head element 1, bit 1, head element 2, bit 2, and so on. At $STEP_1$, the next bit at each head element is incremented by "j" until "k" bits have been read from each head. A one track seek and reverse direction action is taken, then the bit number incremented by "j", repeating $STEP_1$ until "L−1" seeks are completed and "L" tracks have been read. Once completed, $STEP_2$ will be a decrement of "p". If "p" is greater than zero, then a "k" bit longitudinal head reposition seek (i.e., one track up and "k" bits over) is performed and the bit number incremented at each head by "j." $STEP_1$ is then repeated. If "p" equals zero, then a "p×L" track head reposition seek to move to the next MAU is performed and the operation returns to $STEP_0$.

Figures 6, 7:
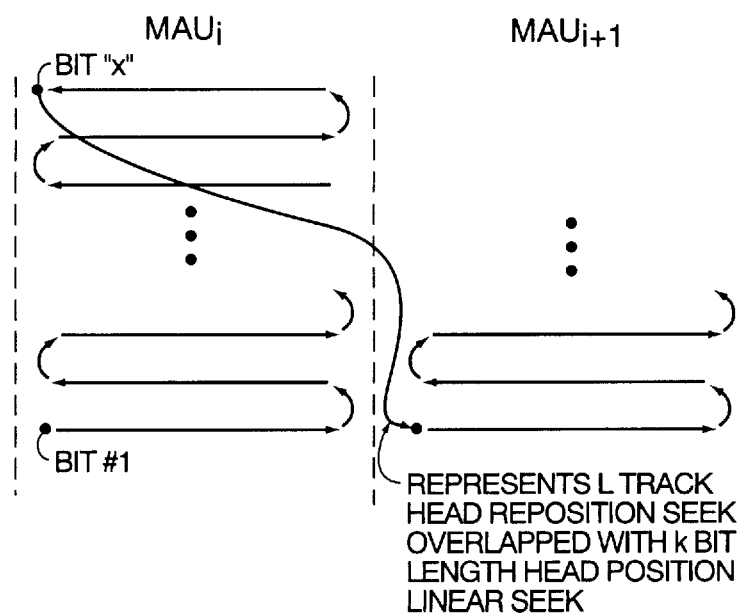
FIG. 6 (TABLE 1) is a listing of a recording head element map for transferring data in accordance with the recording scheme as shown in FIG. 5.
FIG. 7 is a schematic depiction of an exemplary section of magnetic tape showing extended seek head repositioning.

Now, for operation against a LOW END format in PERFORMANCE mode, that is, for example a twenty-three head element apparatus reading a three head element generated format, FIG. 6, TABLE 1, shows how the head elements can be correlated with the track segment groups. All heads can read in parallel by placing bits into the track image buffer according to the "k,j,p,L" notation. Note that setting the notation modulo 8 suffices for bit position in a byte and, therefore, dividing that notation by 8 allows for byte addressing. The STEP by STEP logic provided above now tracks the data as with the NATIVE mode.

Note that when "L" is an odd number, the segment boundary spacing must be such as to allow the head to reposition across "L" tracks as shown in FIG. 5. However, when "L" is an even number, the head reposition seek operation is overlapped by a head position linear seek across the full length of a track segment, that is "k" bits, as shown in FIG. 7. Therefore, the preferred embodiment format will use an odd number of tracks "L" in a TSG in order to avoid linear seek requirements when using a high performance drive.

Figure 8:
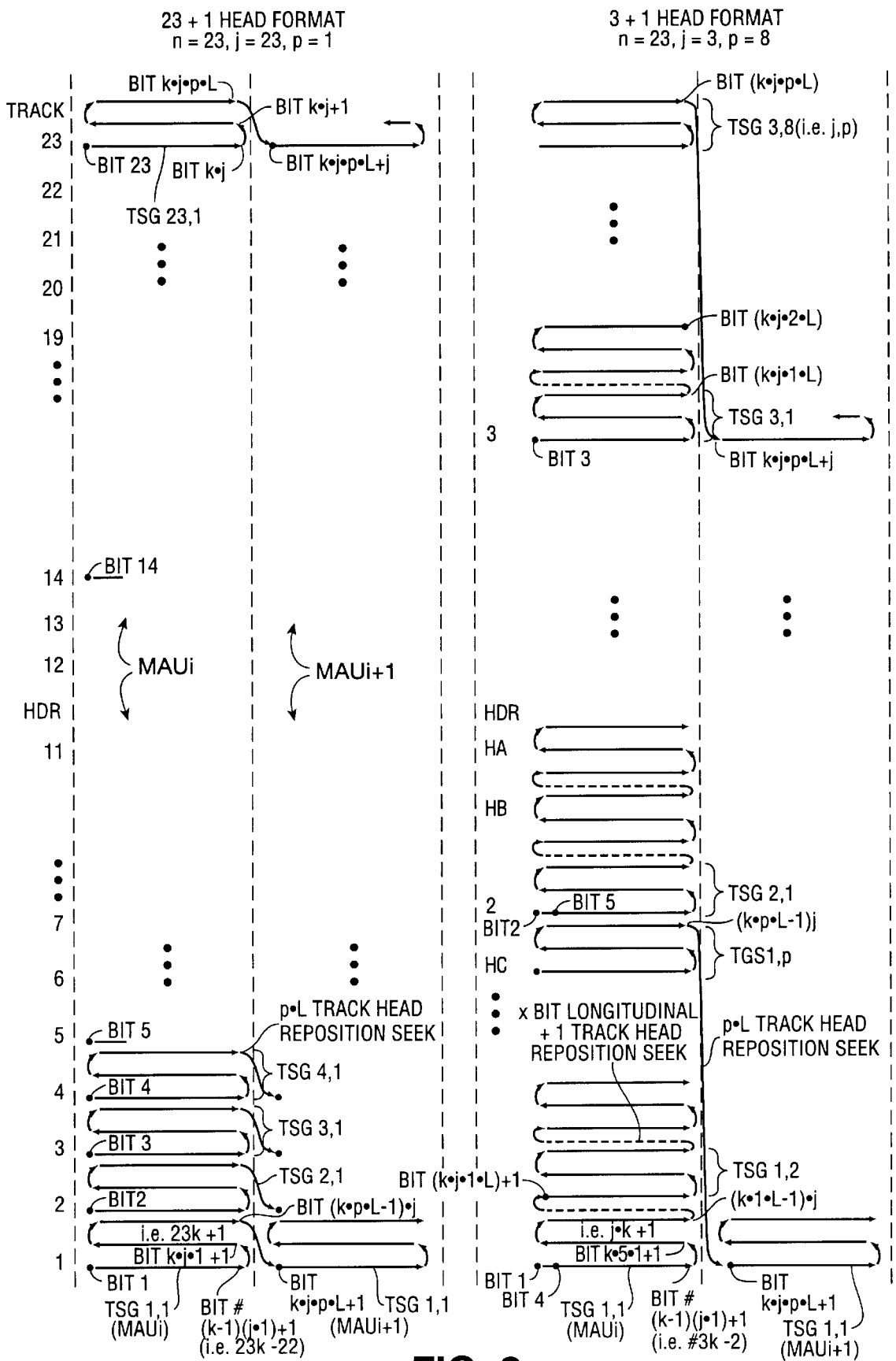
FIG. 8 is a schematic depiction of an exemplary embodiment comparing a twenty-three head format recording scheme to a three head format recording scheme in accordance with the present invention.

Turning now to FIG. 8, an optimized bit positioning map for a twenty-three head HIGH END format versus a three head LOW END format is demonstrated in which:

L=3, n=23, j=23 or 3, where:

"j" is an integer $\geq 1$ representing the number of head elements that are concurrently active while reading or writing and representing the number of TSG that will comprise a track segment group set, "p"=n/j, representing the number of TSG sets in a MAU and the number of times the header TSG is written when filling MAU; and "p" sets of "j" TSG sets will fill a MAU (i.e., when "j"="n", "p"=1 and when "j"<"n", "p">1.)

The same analytical logic applies in this comparison as in FIG. 5.

Thus, with the use of the track image buffer and this mapping scheme, compatibility has been created to interchange data tapes where full drive capability is employed despite the latent NATIVE mode incompatibility.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. An apparatus, adapted for use with a data processing means, for reading and writing data for said data processing means on a removable recording medium in accordance with a predetermined data format having a given data rate level of performance, comprising:
   a. drive means for transferring data to and from said medium;
   b. controller means, operatively connected to said drive means, for controlling operation of said drive means;
   c. interface means, operatively connected to said controller means, for connecting said apparatus to said data processing means and for allowing data flow between said controller means and said data processing means; and
   d. buffering means, operatively connected to said controller means, for imaging data in a format other than said predetermined data format such that data is selectively imaged in said buffering means during said transferring of data having a higher performance data reading and writing format with a data rate level of performance greater than said predetermined data format to said medium and a lower performance data reading and writing format with a data rate level of performance lesser than said predetermined data format from said medium.

2. The apparatus as set forth in claim 1, wherein said controller means further comprises:
   means for formatting data in accordance with said predetermined data format.

3. The apparatus as set forth in claim 2, wherein said buffering means further comprises:
   a random access memory means, connected to said controller means, for holding data in accordance with predetermined formats other than said predetermined data format.

4. A data storage device, adapted to use removable recording media for storage and retrieval of data generated by a data processing apparatus, comprising:
   a. transport means, selectively engageable with at least one recording medium, for moving said medium, and having a read-write means for transferring data to and from said medium during said motion;
   b. channel means, connected to said read-write means, for selectively controlling functionality of said read-write means;
   c. controller means, operatively connected to said channel means and said transport means, for controlling functionality of said transport means and for formatting data in accordance with a predetermined read-write data format having a given data rate level of performance;
   d. buffer means, connected to said controller means, for imaging data in accordance with higher level performance data read-write formats having data rate levels of performance greater than said predetermined read-write data format; and
   e. interface means, connected to said controller means, for connecting said data storage device to said data processing data storage device.

5. The device as set forth in claim 4, wherein said buffer means further comprises:
   a random access memory means for holding data in accordance with predetermined formats other than said predetermined read-write data format.

6. The device as set forth in claim 4, wherein said controller means further comprises:
   means for determining when said medium contains data in a second read-write data format other than said predetermined read-write data format.

7. The device as set forth in claim 6, wherein said controller means further comprises:
   means for formatting data in accordance with read-write formats other than said predetermined format and transferring data to said buffer means in accordance with a second read-write format.

8. A method for writing data on a removable medium to restructure said data from a low performance data recording format having a low data rate level of performance of a low performance data read-write apparatus adapted to use said removable medium to a high performance data recording format having a high data rate level of performance of a high performance data read-write apparatus adapted to use said removable medium, comprising:
   receiving said data in accordance with the low performance data recording format;
   providing a buffering means for storing said data;
   restructuring said data from said low performance data recording format to said high performance data recording format using said buffering means; and
   writing said restructured data from said buffering means to said medium in accordance with said high performance data recording format.

9. In a read-write apparatus for the storage and retrieval of data on a removable mass storage medium, said apparatus having a first native format mode for recording data including a first transfer rate, a method for writing data on said medium in a second native format mode for recording data including a second transfer rate, comprising the steps of:
   a. determining whether said second native format mode is a format of a higher or lower level performance recording format mode than said first native format mode;
   b. if said second native format mode is a lower level performance recording format mode than said first native format mode:
      (1) transferring said data to a track image buffer,
      (2) re-sequencing said data in said track image buffer in accordance with said second native format mode, and
      (3) transferring said re-sequenced data from said track image buffer to said medium according to said second native format mode at said first transfer rate; or
   c. if said second native format mode is a higher level performance recording format mode than said first native format mode:
      (1) transferring said data to a track image buffer,
      (2) re-sequencing said data in said track image buffer in accordance with said second native format mode,
      (3) writing said re-sequenced data to said medium such that said data is written in said second native format mode such that said data can be transferred at said second transfer rate when said medium is used with an apparatus operational at said second native format mode.

10. A method of reading data on a removable medium using a low performance data read-write apparatus having a low performance native mode format wherein said data is stored on said medium in accordance with a high performance native mode format of a high performance data read-write apparatus wherein said high performance native mode format has a data rate level of performance greater than said low performance native mode format, comprising:

retrieving said data from said recording medium into a buffering means with said low performance data read-write apparatus in accordance with said high performance native mode format;

restructuring said data from said high performance native mode format to said low performance native mode format using said buffering means; and reading said restructured data from said buffering means in accordance with said low performance native mode format with said low performance data read-write apparatus.

11. In a read-write apparatus for the storage and retrieval of data on a removable medium, said apparatus having a first native format mode with a data rate level of performance for reading data, a method for reading data from a medium recorded with data in a second native format mode having a data rate level of performance different from said first native format mode of said apparatus, comprising the steps of:

a. determining whether said second native format mode has a higher or lower data rate level of performance than said first native format mode;

b. transferring said data in parallel simultaneously from said medium to a track image buffer in accordance with said second native format mode if said second native format mode has a lower data rate level of performance than said first native format mode;

c. transferring said data from said medium to said track image buffer in accordance with said second native format mode if said second native format mode has a higher data rate level of performance than said first native format mode;

d. re-sequencing said data in accordance with said first native format mode; and e. reading said re-sequenced data from said track image buffer in accordance with said first native format mode.

12. A method for data format restructuring between low and high performance formats having respective low and high data rate levels of performance in a mass storage medium drive having a read-write head device, a transport device for receiving a media and transporting said media across said head device, a controller device for controlling operation of said head device and said transport device and having an interface device for connecting said drive to a communication bus of a host system, said controller device being adapted to transfer data to and from said media, comprising:

providing a track imaging buffer, connected to said controller device; and restructuring data in said track imaging buffer to said high performance format when data is transferred by said controller device to the track imaging buffer in said low performance format.

13. The method as set forth in claim 12, wherein said step of restructuring data further comprises:

determining whether a media loaded in said transport device is formatted in said first predetermined format;

if said media format matches said first predetermined format and a piecewise mode has not been preselected, performing data read and write functions using said controller device without restructuring data in said track imaging buffer; or if said media format matches said first predetermined format and a piecewise mode has been preselected, performing read and write functions by forming a resequenced image of said data in said track imaging buffer, and using said read and write head device in accordance with said resequenced image of said data, or if said media format does not match said first predetermined format, performing data read and write functions by forming a resequenced image of said data in said track imaging buffer, and using said read and write head device in accordance with said resequenced image of said data, whereby read and write head device performance is augmented by use of said resequenced image of said data by said read and write head device.

14. The method as set forth in claim 13, wherein said media format matches said first predetermined format and a piecewise mode has been preselected, reading data further comprises:

sequencing data through said track imaging buffer in accordance with device resources specified.

15. The method as set forth in claim 13, wherein said media format matches said first predetermined format and a piecewise mode has been preselected, writing data further comprises:

dividing said data and storing said data in said track image buffer in accordance with device resources specified, sequencing said data through said track image buffer, and painting said data to said media in accordance with the device resources specified.

16. The method as set forth in claim 13, wherein said media format matches said first predetermined format, performing command functions other than read and write functions comprises:

determining if said function includes a format identity change, and if there is a format identity change, determining if said format identity change is to a lower performance format than said first predetermined format or to a higher performance format than said first predetermined format, and using said track imaging buffer to form a resequenced image of data thereafter, or if there is no format identity change, implementing said command function.

17. The method as set forth in claim 13, wherein said media format does not match said first predetermined format, said step of performing data read and write functions further comprises:

determining if said media is unformatted, pre-formatted but blank, or has a format identity of a lower performance format than said first predetermined format, or of a higher performance format than said first predetermined format; and if said media is unformatted or pre-formatted and blank and said function is a read function, sending a signal so indicative from said controller device to said host system, or if said media is unformatted or pre-formatted and blank and said function is a write function without format identity specification, performing said write function in said first predetermined format, or if said media is unformatted or pre-formatted and blank and said function is a write function with format identity specification, determining whether said format identity specification is said first predetermined format, or a lower performance format than said first predetermined format, or a higher performance format than said first predetermined format, and if said format identity specification is said first predetermined format, performing said write function without restructuring data in said track imaging buffer, or if said format is a lower performance format than said first predetermined format or a higher performance format than said first predetermined format, performing said write function by restructuring data in said track imaging buffer to augment read and write head performance.

18. The method as set forth in claim 13, wherein said media format does not match said first predetermined format, performing functions other than data read and write functions comprises:

determining if said media is unformatted, pre-formatted but blank, or has a format identity of a lower performance format than said first predetermined format, or of a higher performance format than said first predetermined format; and if said media is preformatted but blank, implementing said other function, setting said format identity to said preformatted identity, determining whether said other function commands a format identity change, and if said other function commands a format identity change, determining whether the identity change matches or does not match said first predetermined format and setting said controller device accordingly, or if said other function commands no format identity change, waiting for a next command.

19. The method as set forth in claim 13, wherein said media format does not match said first predetermined format and said media has a format identity of a lower performance format than said first predetermined format, said read function comprises:

deciding whether said read function is to be performed in a manner equivalent to said lower performance format, or in accordance with the performance capability of said read-write head device, or in a piecewise manner, and if said read function is to be performed in a manner equivalent to said lower performance format, using said read-write device to match said lower performance format, or if said read function is to be performed in accordance with the performance capability of said read-write head device, sequencing data from said media through said track imaging buffer in a sequence compatible with said read-write head device, and transferring said sequenced data from said track imaging buffer to said communication bus, or if said read function is to be performed in a piecewise manner, sequencing data from said media through said track imaging buffer in accordance with device resources specified.

20. The method as set forth in claim 13, wherein said media format does not match said first predetermined format and said media has a format identity of a lower performance format than said first predetermined format, said write function comprises:

deciding whether said write function is to be performed in a manner equivalent to said lower performance format, or in accordance with the performance capability of said read-write head device, or in a piecewise manner, and if said write function is to be performed in a manner equivalent to said lower performance format, using said read-write device to match said lower performance format, or if said write function is to be performed in accordance with the performance capability of said read-write head device, writing data to said track imaging buffer in a format sequence compatible with said read-write head device, and transferring said sequenced data from said track imaging buffer to said media, or if said write function is to be performed in a piecewise manner, dividing and storing said data in said track image buffer in accordance with the device resources specified, sequencing the data through said track image buffer, and painting said data to said media in accordance with the device resources specified.

21. The method as set forth in claim 13, wherein said media format does not match said first predetermined format and said media has a format identity of a lower performance format than said first predetermined format, functions other than performing read and write functions comprises:

determining if said other function includes a format identity change, and if there is a format identity change, determining if said format identity change is to a format matched to said first predetermined format or a format higher than said first predetermined format, and implementing said command function and said format identity change, or if there is no format identity change, implementing said command function.

22. The method as set forth in claim 13, wherein said media format does not match said first predetermined format and said media has a format identity of a higher performance format than said first predetermined format, said read function comprises:

determining whether said read-write device is to use full operational capability resources for read-write functions or a subset of capability resources to implement a piecewise manner of functionality; and if using said read-write head device at said full operational capability to read data, using said controller device to sequence data from said read-write head device into said track imaging buffer, and transferring said sequenced data from said track imaging buffer to said communication bus; or if using said subset of capability resources to implement said piecewise manner of functionality to read data, using said controller device to sequence data from said read-write head device into said track imaging buffer using only those capability resources specified to implement said piecewise manner of functionality, and transferring said sequenced data from said track imaging buffer to said communication bus.

23. The method as set forth in claim 13, wherein said media format does not match said first predetermined format and said media has a format identity of a higher performance format than said first predetermined format, said write function comprises:

determining whether said read-write device is to use full operational capability resources for read-write functions or a subset of capability resources to implement a piecewise manner of functionality;

using said controller device to divide and store data from said communication bus in said track imaging buffer in a sequence compatible with said read-write head device capability;

transferring said sequenced data from said track imaging buffer to said read-write head device wherein if using said read-write head device at said full operational capability to write data, writing said sequenced data on said media in said higher performance format using full operational capability of said read-write head device, or if using said read-write head device at a predetermined specified subset of capability resources, writing said sequenced data on said media using only those read-write head device capability resources specified to paint said data on said media in said format.

24. The method as set forth in claim 13, wherein said media format does not match said first predetermined format and said media has a format identity of a higher performance format than said first predetermined format, functions other than performing read and write functions comprises:

determining if said other function includes a format identity change, and if there is a format identity change, determining if said format identity change is to a format matched to said first predetermined format or a format lower than said first predetermined format, and implementing said command function and said format identity change, or if there is no format identity change, implementing said command function.

25. The method as set forth in claim 12, wherein step of restructuring data in said track imaging buffer further comprises:

mapping said data to said track imaging buffer such that latencies are minimized in transferring data between said track imaging buffer and said media.

26. The method as set forth in claim 25, said step of mapping said data further comprises:

structuring said data for writing on said media such that track changes by said read-write head device are minimized.

27. A magnetic tape drive for reading and writing data to at least one removable magnetic recording tape for a host device connected to a data bus, said drive being adapted to read and write data in accordance with a native data format mode of operation having a given data rate level of performance that uses all read-write functionality capability of said drive, comprising:

a read-write head having a plurality of read-write elements;

a tape transport for receiving said magnetic recording tape and transporting said tape across said read-write head such that said read-write head elements interface with said magnetic recording tape;

a recording channel device connected to said read-write head elements;

a controller-formatter device connected to said recording channel device;

a bus interface device connected to said controller-formatter and said data bus; and a track image buffer connected to said controller-formatter such that data to and from said bus can be imaged in a sequence other than said native data format mode and transferred by said controller to and from said tape via said channel device in said sequence other than said native data format mode, whereby said drive is adapted to read and write magnetic recording tapes having either one of a higher level performance format with a data rate level of performance greater than said native data format and a lower level performance format with a data rate level of performance lesser than said native data format mode using all or a subset of said read-write functionality capability of said drive.

* * * * *